M. HUNGERFORD.
Ore-Concentrators.
No. 128,628. Patented July 2, 1872.
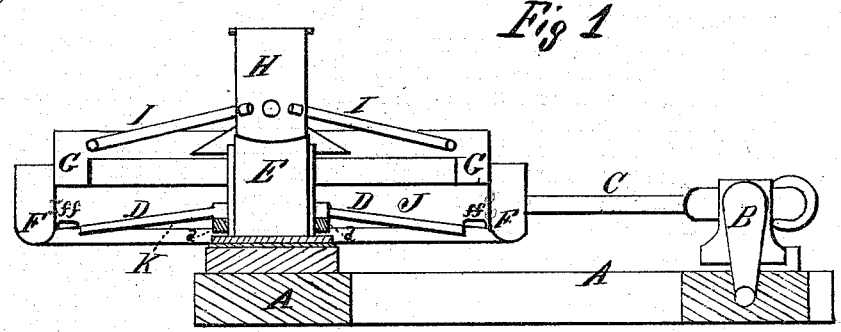
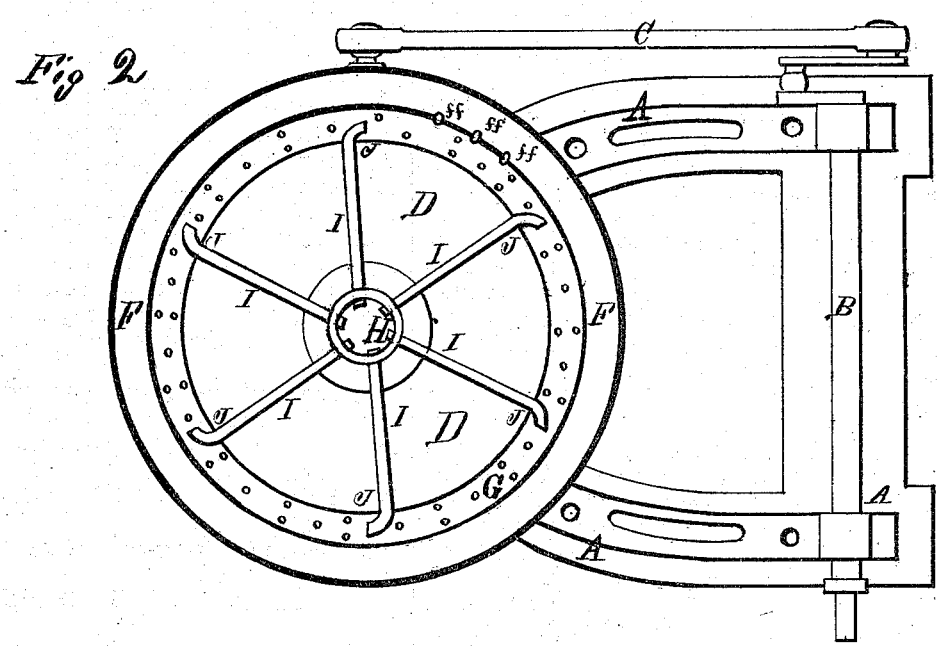
Witnesses:
W. E. Raymond
Emma Greenaway
Inventor
M. Hungerford by
H. B. Beadle, atty.

121,628

UNITED STATES PATENT OFFICE.

MORGAN HUNGERFORD, OF SAN FRANCISCO, CALIFORNIA.

IMPROVEMENT IN ORE-CONCENTRATORS.

Specification forming part of Letters Patent No. 128,628, dated July 2, 1872.

SPECIFICATION.

*To all whom it may concern:*

Be it known that I, MORGAN HUNGERFORD, of the city and county of San Francisco, State of California, have invented certain new and useful Improvements in Concentrators for Concentrating Sulphurets and any of the Precious Metals; and I do hereby declare that the following is a full, clear, and exact description of the same, reference being had to the accompanying drawing making a part of the specification, in which—

Figure 1 is a vertical section of a concentrator; Fig. 2, a plan.

The same letters in all the figures indicate identical parts.

My present invention relates to additional improvements in concentrators of the class shown in my Letters Patent dated March 12, 1867; and consists in certain alterations and improvements, to be specifically pointed out in the following specification and claims.

In the annexed drawing, A represents the frame, and B the crank-shaft, which gives motion to the pan by means of the connecting-rod C. The pan D is of the ordinary construction, having a convex-shaped bottom, with a central discharge and a raised central hub, $d$ $d$, and oscillates upon a vertical hollow shaft or axle, E, provided with a broad step and a raised ring, which is for the purpose of retaining the lubricating material within the bearings of the machine. By the adoption of this hub I obtain a uniform and easy motion of the pan, and the sulphurets, when once separated from the sand, may remain in that condition until drawn off into the outer receptacle, which is a chamber especially for their reception, which is marked F, and formed by the addition of an outside rim around the periphery of the convex-shaped bottom pan D, which has a central discharge for *débris*, and is provided with sundry openings or outlets, marked $ff$, in every six inches, or a sufficient number for the purpose of the circumference of the periphery of the pan D, to allow the sulphurets or other concentrated matter to pass into the outer rim or chamber, from which it may be drawn as concentrated ore through the openings in the outer wall of the chamber F. G in the drawing represents a trough perforated at the bottom, which is attached to the inside of the rim of the convex-shaped bottom pan D. This is for the purpose of receiving the ores from the mill as conveyed from the hopper H through pipes I, which have a curvature or elbow, J, at their outlet, by which a current is created in the perforated bottom trough G. K is a spout attached to the under side of the pan D for the purpose of carrying off the *débris*, so as to protect the center or hub from the entrance of sand or grit, which would injure it. By this everything is excluded from the "broad step and raised ring" except the lubricating material, which is necessary for the perfect oscillating working of the pan D.

I do not claim the features shown in my former patent above referred to; but,

Having thus described my invention, what I claim, and desire to secure by Letters Patent, is—

1. The combination of the trough G with the pan D having perforations $f\ f$ leading into chamber F and discharge-spout K, as described.

2. The hub $d$, in combination with the shaft E and ring holding the lubricating materials, as described.

In testimony whereof I have hereunto set my hand and seal.

MORGAN HUNGERFORD. [L. S.]

Witnesses:
C. W. M. SMITH,
E. V. SUTTER.